United States Patent [19]
Fredriksson

[11] Patent Number: 5,883,800
[45] Date of Patent: Mar. 16, 1999

[54] ARRANGEMENT FOR COMPONENTS INCLUDED IN MOBILE HYDRAULIC EQUIPMENT

[75] Inventor: Lars-Berno Fredriksson, Kinna, Sweden

[73] Assignee: Parker Hannifin, AB, Boras, Sweden

[21] Appl. No.: 637,780

[22] PCT Filed: Nov. 20, 1995

[86] PCT No.: PCT/SE95/01373

§ 371 Date: Oct. 3, 1996

§ 102(e) Date: Oct. 3, 1996

[87] PCT Pub. No.: WO96/18136

PCT Pub. Date: Jun. 13, 1996

[30] Foreign Application Priority Data

Dec. 6, 1994 [SE] Sweden .................................. 9404220

[51] Int. Cl.⁶ .............................. G06F 19/00; G06F 13/00
[52] U.S. Cl. ............................................ 364/138; 395/287
[58] Field of Search ..................................... 364/138, 139, 364/131–136, 424.07; 395/280, 284, 285, 286, 287–305, 200.31, 200.6, 200.62, 200.63, 200.83

[56] References Cited

U.S. PATENT DOCUMENTS 4,468,738  8/1984  Hansen et al. ........................... 395/291
5,246,039  9/1993  Fredriksson ........................... 364/138 X
5,323,324  6/1994  Fredriksson ........................... 364/138 X
5,446,846  8/1995  Lennartsson ............................. 395/280

FOREIGN PATENT DOCUMENTS 466726  of 0000  Sweden .

OTHER PUBLICATIONS

Uusljarvi et al., Introducing Distribution Control In Mobile Machines Based On Hydraulic Actuators, Mechatronics, vol. 4, No. 2, pp. 139–157, 1994.

*Primary Examiner*—Joseph Ruggiero
*Attorney, Agent, or Firm*—Pollock, Vande Sande & Amernick

[57] ABSTRACT

A control system for control of components in mobile hydraulic equipment, the control system being in the form of a CAN system and comprising modules controlling the components and a bus connection. A signal mirroring unit is provided via which the modules are connected to the bus connection. The signal mirroring unit reflects signals generated internally in the module back to the module and prevents the signals from appearing on the bus connection, at least during an activation phase. This allows the control system to operate disruption free.

20 Claims, 2 Drawing Sheets

ARRANGEMENT FOR COMPONENTS INCLUDED IN MOBILE HYDRAULIC EQUIPMENT

TECHNICAL FIELD

The invention can be used for hydraulic components intended to be used as building elements for mobile hydraulic equipment. As examples of hydraulic components, mention can be made of hydraulic valves, control levers, hydraulic cylinders, hydraulic motors etc. In one exemplary embodiment, a hydraulic valve is controlled with a control lever equipment and the valve effects oil flow or oil pressure depending on the control. Such control systems can be included in forest machinery in which the hydraulics can be used for timber loading, control etc. Other examples are mining machinery, and various types of other loading machines, e.g. trucks with buckets, pallet lifters etc. Further examples are working baskets, lifting machines, agricultural machinery, and mining equipment etc.

In the equipment user is made of the standardized CAN system (Controller Area Network) as a control and monitoring system. The CAN system includes a number of nodes or modules which can communicate with one another via a two-wire or a several wire bus connection in the control and monitoring system, which is characterized by series communication on the bus communication. The module can comprise master and slave modules. Reference is also made, quite generally, to inter alia said standard with the designation ISO 11898.

BACKGROUND OF THE INVENTION

State of The Art

It is already known to use the CAN system in connection with vehicles and mobile equipment. From the publication dated 30-03-1994 from Honeywell Micro Switch Division, it is known to provide a special program in the system in order, after restarting, to make the various modules work with a bit speed fixed by or in the system. Among other things, a special NOOP message is transmitted on the bus connection upon restarting. A special elimination bit in this connection is initiated in a control register in the system, which causes the transmitter in question to terminate its message, irrespective of whether acknowledgement is received or not. The master module must subsequently check whether there is a NOOP acknowledgement on the connection. If no such acknowledgement appears on the connection, the master module repeats the check. If the acknowledgement exists, the module takes this as confirmation that the connection is in operation, whereupon other nodes can adjust themselves to the correct bit speed or corresponding parameters.

It is possible, in a conventional manner, to prevent the CAN circuit from carrying out transmission on the bus connection in association with the restarting. This can take place, e.g., by the output in question from the CAN circuit being programmed to make this possible. In this manner, the CAN circuit can be made to listen to the bus without the CAN circuit transmitting an error message or acknowledgement bit on the bus connection in question. When the CAN circuit receives a message, this takes place at a bit speed which can be set with certain parameters and which can be adjusted to make possible reception of the bit speed applicable in the system. In this manner, the CAN circuit can communicate on the connection without disrupting or corrupting the communication on the connection by working with incorrect parameters/bit speed. It is to be noted in this case that the rules of the CAN system state that one priority field in the CAN system may not be used by two modules simultaneously. In order to avoid an error message if two or more modules are transmitting simultaneously, this must be counteracted with the aid of rules in the software and programs of the CAN system (cf. above).

SUMMARY OF THE INVENTION

Each special arrangement in the system programming complicates the system and its application. There is a need to utilize the basic principles for the CAN system and to make these work in situations which were not presupposed from the outset by the original system builders of the CAN system. The invention solves this problem, among others, and proposes that the modules or the nodes themselves are made to appear exactly in the manner which was envisioned when the system of rules was set up for CAN.

There is also a need that installations exchange, addition and reduction of components in assembled mobile hydraulic equipment is to be technically simple for the system builders of the mobile equipment. The suppliers of individual (hydraulic) components are to be able to make available their products to the system builders without comprehensive and individual program adjustments for the system having to be made when modifications, improvements etc. are to be carried out. The invention also solves this problem.

The suppliers of hydraulic components according to the above are able to further develop further their products and carry out service (exchange, repair etc.) on existing hydraulic equipment without giving rise to reprogrammings in the CAN system of the equipment. The invention solves this problem also.

The problem in using programming to prevent the module in question from transmitting an error message or acknowledgement bit in the situations in question is that such a proposal requires that one of the modules is already communicating on the bus connection when the module attempts to gain access to the bus connection after restarting. This, in turn, requires that the party responsible for the system in some way makes available the parameter/bit speed which applies in the functioning stage in question. The module in question of the modules in the system must therefore state the parameters in question which can be checked by other modules before these become active on the bus. In a first exemplary embodiment, it is not sufficient that there is only one module which is transmitting since the module in question, on its transmission, does not receive any acknowledgement bit from a passive module. For the single transmitter this is not a large problem since the rules in the CAN system are such that the module which is transmitting repeats the transmission until it receives an acknowledgement bit. For the module or the modules which passively receive the transmitted message, it is interpreted as an error if an acknowledgement bit is not detected. As a result of this, the respective receiver will generate an error message, which means that the message, which in reality is transmitted correctly from the transmitting module, is interpreted as an error by the respective receiving module and is therefore automatically rejected according to applicable rules for the CAN system. This gives rise to the module being disconnected from the bus after a certain time. The module which is using the CAN system cannot distinguish this case from the case where an incorrect bit speed or another parameter was selected. The module is therefore compelled to leave the bus connection in spite of the fact that the module had the correct bit speed or corresponding parameter and would have been able to be connected to the bus. The invention aims to solve this problem also.

It can be considered characteristic of an arrangement which solves the problems indicated above that the respective control and/or monitoring module in question is connected or connectable to the bus connection via a signal-mirroring unit and/or a rule-infraction eliminator which ensures that there is disruption-free and/or collapse-free system functioning even in the activation or connection situations, e.g. system restarting.

Further developments of the inventive idea emerge from the subsequent subclaims.

By means of what is proposed above, a monitoring and checking, defined by the supplier, of the adaptation of the system to various activation and connection situations is made available. Modifications and further developments of components can be implemented in an already completed mobile hydraulic equipment and in the new manufacture of such hydraulic equipment. The rule-infraction eliminator can be adapted to any modifications and further developments in the construction and functions of the system and the equipment.

BRIEF DESCRIPTION OF THE DRAWINGS

A for the moment proposed embodiment of an arrangement which has the characteristics which are significant of the invention is to be described below with simultaneous reference to the attached drawing in which.

DETAILED DESCRIPTION OF THE INVENTION

Figure 1:
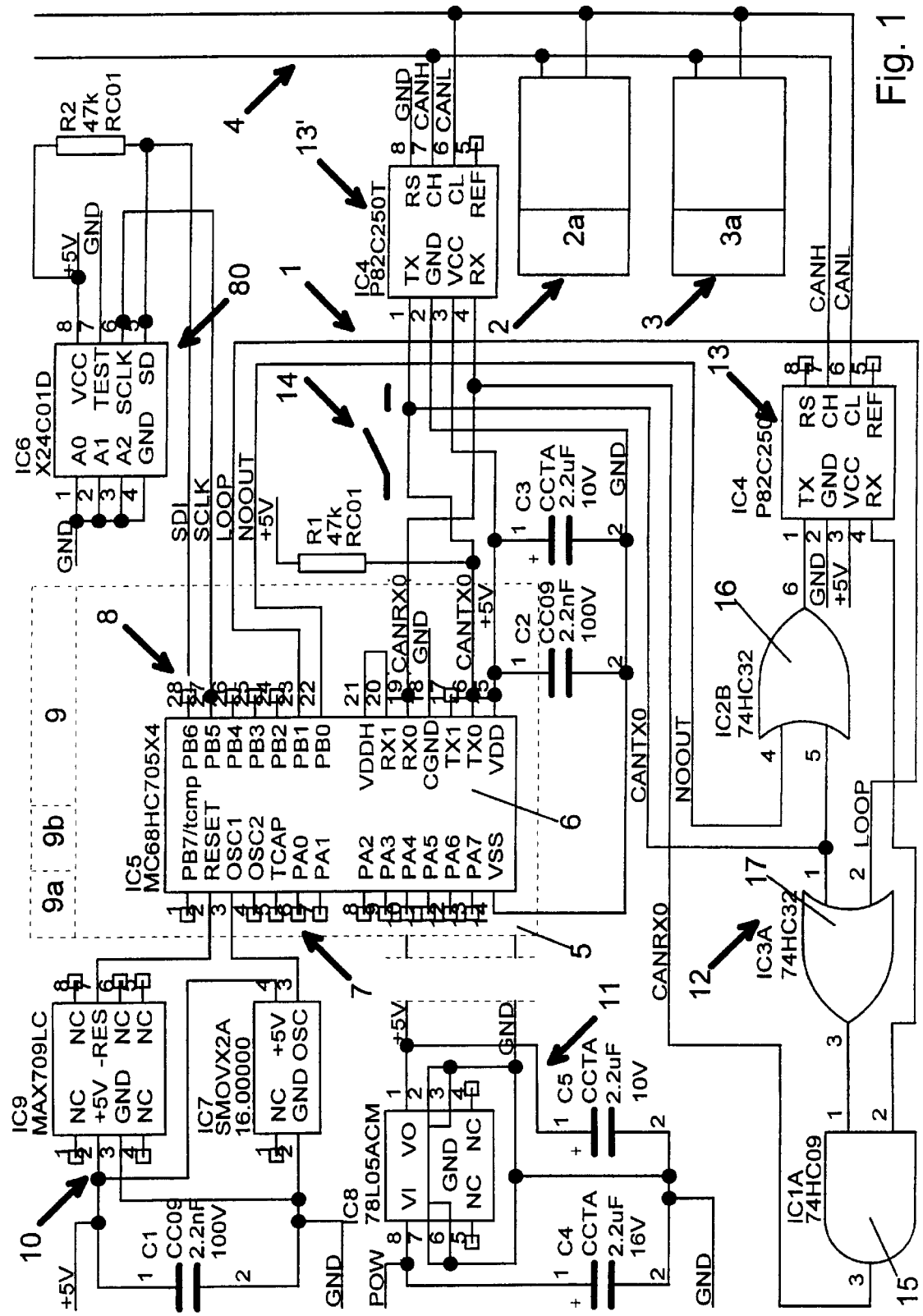
FIG. 1 shows an exemplary embodiment of the construction of the module and its connection to an appropriate component for mobile hydraulic equipment.

In the figure, one of the parts in a CAN system involved in the invention has been shown. Designations which are not described, e.g. on outputs and inputs of the system and components thereof, have been allowed to remain in order to better to refer to the known standardized CAN system.

In the figure, one module or one node 1 has been shown in its entirety, while two other modules/nodes 2 and 3 have been shown drawn in in broken lines. The modules can communicate with one another in a known manner and/or with any overriding module via a bus connection. The modules can be constructed essentially identically, or have different constructions depending on the equipment or pieces of equipment the respective module is to control and/or monitor.

The module 1 includes a processor 5 with an integrated CAN circuit 6. The processor and the CAN circuit include a number of connection lines 7 and 8. The processor and the CAN circuit control and monitor equipment 9 which can include equipment parts 9a, 9b. The equipment can include a lever, the deflection of which is to bring about a hydraulic flow in a hydraulic valve. The flow can be more or less proportional to the position of the lever. The lever and valve are, in this case, capable of being integrated in an assembled mobile hydraulic system according to the above. The normal case with the lever is that the deflection produces a flow proportional to the deflection. In such a case, the lever controls the speed of a cylinder which is included or the rotation of a motor. The deflection can also give a position. Normally, the hydraulic flow is controlled and some type of servo control is often introduced. The control lever deflection can also be intended to act on a number of cylinders, and so the deflection can, e.g., cause a movement of a loading hook on a crane, which movement can adopt a given direction. The construction of the crane may require activation of a number of cylinders in order to obtain the correct type of movement. It is also possible in robot-like cases to effect movements which are stored in a memory and where the activation in question arises by the stored control commands being fed out to the valves included in the system.

A crystal oscillator circuit 10 and a power supply unit 11 also belong to the module according to the figure. Included, moreover, is a signal-mirroring unit 12, via which the CAN circuit 6 is connected to the bus connection 4. In the exemplary embodiment, a communication circuit 13 is also utilized, and the unit 12 is in this case connected both to the CAN circuit and the communication circuit. The unit 12 is thus inserted between these circuits in the present case. The functioning of the unit 12 can be continuously connected/connectable or connected or connectable only instantaneously in certain activation and/or connection situations. The instantaneous connection function is symbolized by 14. Upon the temporary uncoupling of the mirroring function of the unit 12, the CAN circuit is connected directly to the communication circuit, cf. 13', which relates to a previously known connection function. The switching function can be controlled e.g. from the circuit 13. The unit 12 can thus have an active influence on the data which is transmitted between the circuits 6 and 13, in certain cases, e.g., on starting, while in normal operation it has negligible or very little influence. Such an influence can be constituted by a delay which occurs when the signal has to pass through the unit (3–25 nanoseconds).

According to the idea of the invention, the CAN circuit 6 can listen to the bus without the CAN circuit itself transmitting an error message or an acknowledgement bit on the bus connection. In this manner, it can adapt itself to the bit speed prevailing in the system or another parameter in a known manner.

According to the invention, logic is utilized in the eliminator. In one exemplary embodiment, logic circuits 15, 16 and 17 which are known per se are included.

The arrangement according to FIG. 1 functions as follows.

By virtue of a NOOUT signal being set high, CANTXO signals from the CAN circuit 6 are prevented from reaching the driving stage 13 (is equal to C250T) and further out on the connection 4. In certain exemplary embodiments, the TXO output in question can be made inactive, as a result of which there is no CANTXO output signal, even though the CAN circuit assumes that this will take place. The level of the CANTXO signal is ensured with the aid of a resistor R1 which is normally used to ensure that the module remains inactive out on the bus connection 4 when the CAN circuit is for some reason not started or active. In this case, the CAN circuit is restarted (reset) when this setting is to be changed. The reset function is found in some CAN circuits and is appropriate in these. A change from inactive to active state with the aid of the NOOUT signal requires no resetting of the CAN circuit. With the NOOUT signal, it is therefore ensured that the module 1 does not transmit anything on the CAN bus, and, by a change of logic level on the NOOUT signal, the CAN circuit can gain access to the bus connection without resetting and/or reprogramming of the CAN circuit having to be carried out. According to the above, it is not sufficient to prevent the CAN circuit from obtaining access to and communicating out on the CAN bus in the event that there is no other module connected to the bus connection and the acknowledgement bit is reflected with what is being transmitted on the bus connection. By virtue of the LOOP signal being set low, the CANTXO signal can be generated at the RXO (CANRXO) output. The normal communication on the CAN bus connection is then supplied to the driving stage 13 (P82C250) and via the logic unit 15 (IC1) this signal gains access to RXO (CANRXO) which can then be detected by the CAN circuit. When a complete message has been received, the CAN circuit 6 transmits according to the rules an acknowledgement bit on TXO (CANTXO), which, with the aid of the NOOUT signal and the logic circuit 16 (IC2), prevents the signal in question (acknowledgement) from coming out on the bus connection 4. With the aid of the LOOP signal and the logic units 15, 17 (IC1 and IC3 respectively), this signal will nevertheless remain at the RXO (CANRXO) connection, as a result of which the CAN circuit will according to the rules confirm the message, in spite of the fact that the acknowledgement bit has not been out on the bus.

The unit 12 described also affords the advantage that in the event that, the CAN circuit thinks that there is an error in the communication, the error message transmitted from the CAN circuit can be received in return in a manner which the circuit expects, according to the rules in a normally functioning system.

In a preferred embodiment, the system is arranged in such a manner that the modules do not become active immediately after they have noted that the bit speed or corresponding parameter is correct. In the case described, a single transmitting module will automatically effect transmission if it does not detect the acknowledgement bit. Normally, all modules do not start at the same time, for this reason a message must remain on the bus until all modules have managed to pick up the message. There are different prerequisites in different types of CAN circuits. In one type of circuit, it would be possible for a received message to be judged to be correct even though no acknowledgement is received. In such a case, the module in question is allowed to become active on the bus even though the acknowledgement bit is missing. Other errors arising in the signal exchange can be a result of incorrect bit speed, or incorrectness in another parameter concerned, For this reason, the module in question cannot be allowed to become active on the bus connection in the lastmentioned case. In a preferred embodiment, the task of the unit 12 is to reflect internally the transmitted acknowledgement bit on reading in by the bus connection so that a receiving module interprets the message received as a correct message, in spite of the fact that the acknowledgement never appeared on the bus connection.

In certain cases, the unit 12 prevents transmitted messages coming out on the bus connection. The unit 12 can also feedback or reflect an acknowledgment bit generated by the CAN circuit and prevent it being transmitted on the bus connection. The unit 12 thus has two functions. One function prevents transmitted bits coming out on the bus connection and a second function internally reflects what is transmitted and would have come out on the bus connection if the unit 12 had not prevented this. Moreover the unit is transparent for signals appearing from the bus connection. In this manner, simple CAN circuits can pick up an otherwise correct message even though no acknowledgement bit has appeared on the bus. It is to be noted in this connection that a transmitting module in the CAN system receives the acknowledgement of its own transmitted message. The module which transmits the message itself puts a recessive bit out on the bus connection, which bit can be written over by other modules by placing a dominant acknowledgement bit on the bus connection. The acknowledgement is made by all those which received an error-free message.

In the construction according to the figure, use is made of a 68HC05x4 processor with a CAN circuit assembled with the processor to form an integrated circuit. The processor 5 comprises member HC705X4 in FIG. 1. The CAN-circuit or CAN controller is integrated in HC705X4 and is symbolized with 6. The CAN controller communicates with electrical digital signals via the connections or pins 16 TXO and 19 RXO and can also use connections or pins TX1 and RX1 together with connections or pins VDDH 21 and USSI 18. Circuit 13 copies the signals from TX to CH/CL and back to RX in order to adapt the signals TX and RX to the requirements existing on bus 4 (CH/CL). Connections and disconnections of the signal reflection function are prosecuted by means of the signals NOOUT and LOOP, which are obtained from connections or pins 22 of the processor 5. The decision of the reflection operation is executed by the processor 5 (see above). Alternatively, when a circuit other than 82C250 is used, the decision can be made by circuit 13. Member 13 can be connected in the same way as the circuit 13', which represents the prior art connection and which is not included or existing in the present invention as such. Member 80 is a serial memory which stores parameters such as baud rate, the kind of messages which are to be received, step operations, node numbers, and so on. In the shown embodiment the oscillator 10 provides a predetermined frequency, for example 16 MHz, to the processor 5 (the circuit IC5 HC705X4). On the unit, there are four connections for connection to the bus line. The four connections have the designation TXO, TX1 (transmitting) and RXO, RX1 (receiving) respectively. In simple systems, these CAN connections can be connected directly to the bus connection 4. Usually, however, a special circuit 13 is utilized, in this case 82C250 from Philips, which deals more efficiently with the electrical requirements made on the communication. With this circuit, it is normally necessary to use only TXO and RXO in the respective application in question. The signal out from the CAN circuit comes on the TXO connection and the TX1 connection.

Normally, one of these signals is sufficient to deal with transmission on the CAN connection 4, especially if use is made of a driving stage of the 82C250 type. For reading off the CAN connection 4, use is made of inputs RX0 and RX1, where RX0 is the input for CAN and RX1 is a change-over reference to RX0. RX1 is normally connected to 2.5 volts which means that RX0 over the voltage on RX1 is interpreted as "1" and under RX1 is interpreted as "0". A crystal oscillator 10 indicated in the figure is required in order to make the processor 5 function.

Figure 2:
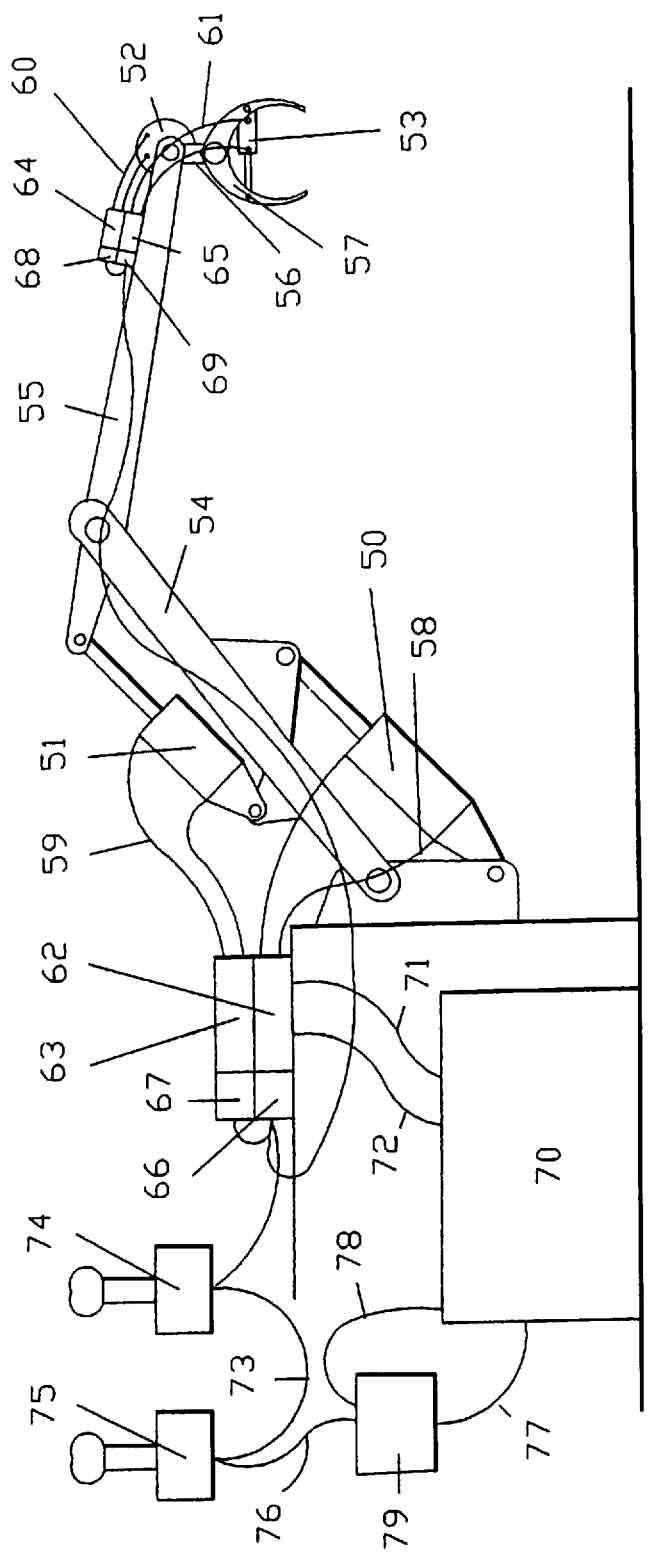
FIG. 2 shows a constructive exemplary embodiment of hydraulic equipment with a CAN system

In FIG. 2, an exemplary embodiment with a lifting crane for different types of goods is shown. The equipment described is somewhat simplified and includes slightly fewer components than is normal in order that the description of the principle is clear. In order to move the crane, there are, in this case, four motors 50 which lift and lower a main jib 54, 51, which in turn lifts and lowers an outer boom 55. A rotating motor 52 on the boom 55 rotates a gripping head 56 and a cylinder 53 which opens and closes a gripper 57. The motors are controlled by an oil flow being supplied on one or the other side of the respective motor via two hoses or pipes. In this manner, the motors can be made to go forwards or backwards.

The cylinder 50 is controlled by a hydraulic valve 62 via hoses 58. The cylinder 51 is controlled by the flow from a valve 63. The rotating motor 52 is controlled via hoses 60 from a valve 64 and the cylinder which opens and closes the gripper is controlled via hoses 61 from a valve 65. The hydraulic valves are of known type, e.g. L90 or K170, which in principle include a housing with a round ground slide. As a result of the geometrical shaping of the slide and the housing, it is possible to obtain a given flow out of the connected hoses. The oil which is controlled by the slide is obtained from a pump 70 via the line 72 to a valve block, which consists of two valve sections 62 and 63. A line 71 runs from the valve block with return oil to a tank, from which the pump collects its oil for pumping out. The pressure and return line to the block with the sections 64 and 65 are not shown for the sake of clarity.

The slide in the valve section can be acted on directly by a lever. In the present case, there are electronics which, via an electric driving stage, act on the valve so that the slide can be displaced. This can take place by means of an electromagnet which drives the slide directly or via a servo stage which drives a smaller oil flow which in turn acts on the slide. Other solutions are also possible, such as motors which open and close a servo valve or drive the slide directly or via another unit which can act on the flow to the motors.

The driving electronics in question have a microprocessor which, via a CAN communication according to the above, can be controlled and communicate with other equipment. Electronics 66, 67, 68 and 69 are included in each valve section. All valves or groups of valves are connected to a CAN bus 73. This bus normally consists of a twisted pair with ground reference for the communication, and also a power feed in order to drive the processor and the driving electronics. In certain cases, the power feed and the bus line are separate. Alternatively, there are several power feeds.

The valves are normally controlled by some type of handle 74 and 75. The number of control handles included depend on how many degrees of freedom it is desired to control simultaneously and whether it is to be possible to control the equipment from several different positions without moving the control handle around. When a handle is operated, the size of the deflection will be transmitted as a message. By virtue of the valve electronics being connected to such a message, the valve electronics will each receive their own message by lever deflection, the electronics operate the slide to the same extent as the lever is operated.

The CAN bus 73 can also be extended and connected to other electronics 79 which can have an overriding control of the system or be used for exchange of information with the user via buttons and/or an screen with text and/or image. It can also be envisioned that the CAN bus is extended down to the pump via 78 or that the pump has a separate bus line 77 to the electronics unit 79. If the pump is equipped with control electronics which control the functioning of the pump, it is possible to optimize the functioning of the pump in relation to the demand which is made in the system for the pressure and the flow which the pump should deliver. It is also possible for the pump to advise the system if it is not dealing with the demand of the system in certain periods so that the system can adapt its demand to what the pump can offer at the time.

On starting, there is some function or unit in the system which is responsible for the functioning, e.g. the electronics 79, or, if these are not there, the handle 75 or 74. This unit, which is programmed for this function, begins to communicate with other units on the bus. With the aid of the described solution, all correctly set parts will be able to communicate without disruption, i.e., without being disrupted by an incorrectly set module. If, e.g., the electronics 68 are exchanged for new and the latter is incorrectly set, the system will be able to function so that it is still possible to work with the electronics units 66, 67, and 69 and valves connected to these. It is also possible for the electronics 68 to make a number of attempts and in this manner find its way to the correct bit frequency without corrupting the communication of the other modules.

The invention is not limited to the embodiment shown in the above as an example but can be subjected to modifications within the scope of the following patent claims and the inventive idea.

I claim:

1. A control system for control of components in mobile hydraulic equipment, said control system being in the form of a CAN system and comprising:
    modules controlling said components;
    a bus connection; and
    signal mirroring means, via which said modules are connected to said bus connection, for reflecting signals generated internally in one of said modules back to said one of said modules and for preventing said signals from appearing on said bus connection, at least during a connection phase, whereby said control system functions disruption free.

2. The control system according to claim 1, wherein said signal mirroring means is transparent for signals from said bus connection to said modules.

3. The control system according to claim 1, further comprising further means for preventing said modules from sending outgoing signals on said bus connection.

4. The control system according to claim 3, wherein said further means prevents one of said modules from transmitting on said bus connection until said one of said modules is set to the parameters of said control system.

5. The control system according to claim 1, wherein said signal mirroring means generates an acknowledgement bit to one of said modules when messages received by said one of said modules via said bus connection are not followed by an acknowledgement bit.

6. The control system according to claim 1, wherein said connection phase includes restarting said control system, and connecting, disconnecting or exchanging components in said system.

7. The control system according to claim 1, wherein each said module comprises a processor with an associated CAN circuit; and
    a communication effecting unit, wherein said signal mirroring means is connected to said processor and said communication effecting unit.

8. The control system according to claim 7, wherein said CAN circuit further comprises:
    first and second outputs assigned to outgoing communications;
    first and second inputs assigned to incoming communications;
    a third connection for control of said signal mirroring means, whereby said signal mirroring means prevents said first output from reaching said bus connection.

9. The control system according to claim 7, wherein said signal mirroring means further comprises means for reflecting an error message generated by said CAN circuit back to said CAN circuit, whereby said error message does not appear on said bus connection.

10. The control system according to claim 1, further comprising a resistor arranged to ensure said one of said modules is inactive on said bus connection when said one of said modules has not been started or is not active.

11. The control system according to claim 8, wherein said CAN circuit further comprises a fourth connection for controlling said signal mirroring means to reflect said first output of said CAN circuit to said first input of said CAN circuit.

12. The control system according to claim 8, wherein said communication effecting unit is connected to said bus connection, and said signal mirroring means comprises:
- a first logic circuit receiving an first input from said bus connection via said communication effecting unit and output connected to said first input of said CAN circuit;
- a second logic circuit receiving an input control signal from said third connection and an input from said first output of said CAN circuit; and
- a third logic circuit having an input from said first output of said CAN circuit and from a second control signal output from said fourth connection, and an output to a second input of said first logic circuit;
- wherein said acknowledgement bit is generated at said first output of said CAN circuit and is prevented from appearing on said bus connection by said input control signal, and said acknowledgement bit appears at said first input to said CAN circuit via said first and third logic circuits controlled by said second control signal.

13. The control system according to claim 7, wherein when said CAN circuit detects an error in a message received and transmits an error message as a result, the error message is received in a normal manner even though said error message has not been transmitted on said bus connection.

14. The control system according to claim 1, wherein each said module is not active, after being set to system parameters, until a transmitting module in said system retransmits its message.

15. The control system according to claim 1, wherein said signal mirroring means is only active in said connection phase.

16. The control system according to claim 14, wherein said signal mirroring means allows normal system functioning after said module becomes active.

17. A control system for control of components in mobile hydraulic equipment, said control system being in the form of a CAN system and comprising:
- modules connected to a bus connection in said control system, each said module having a receiving and a transmitting state;
- an acknowledgement generator arranged in each said module and generating an acknowledgement signal inside said module, each said module being arranged to reflect said acknowledgement signal inwardly so said acknowledgement signal does not reach said bus connection.

18. A control system according to claim 17, wherein said acknowledgement generator is arranged between a CAN circuit and said bus connection and functions via a mirroring function.

19. A control system according to claim 18, wherein said acknowledgement generator is integrated in said CAN circuit.

20. A control system according to claim 18, wherein said acknowledgement generator is integrated in a CAN driver circuit.

* * * * *